United States Patent
Cappelle et al.

(10) Patent No.: US 11,981,771 B2
(45) Date of Patent: May 14, 2024

(54) RADIATION CURABLE COMPOSITION

(71) Applicant: ALLNEX BELGIUM, S.A., Drogenbos (BE)

(72) Inventors: Steven Cappelle, Ninove (BE); Robert Potzmann, Brussels (BE)

(73) Assignee: ALLNEX BELGIUM S.A., Drogenbos (BE)

(*) Notice: Subject to any disclaimer, the term of this patent is extended or adjusted under 35 U.S.C. 154(b) by 462 days.

(21) Appl. No.: 16/973,866

(22) PCT Filed: Jul. 2, 2019

(86) PCT No.: PCT/EP2019/067724
§ 371 (c)(1),
(2) Date: Dec. 10, 2020

(87) PCT Pub. No.: WO2020/011600
PCT Pub. Date: Jan. 16, 2020

(65) Prior Publication Data
US 2021/0179767 A1    Jun. 17, 2021

(30) Foreign Application Priority Data
Jul. 9, 2018 (EP) .................. 18182358

(51) Int. Cl.
| | | |
|---|---|---|
| *C08G 18/62* | (2006.01) | |
| *C08G 18/12* | (2006.01) | |
| *C08G 18/40* | (2006.01) | |
| *C08G 18/73* | (2006.01) | |
| *C08G 18/75* | (2006.01) | |
| *C08J 3/24* | (2006.01) | |
| *C08L 75/14* | (2006.01) | |
| *C09D 175/14* | (2006.01) | |
| *B33Y 70/00* | (2020.01) | |
| *B33Y 80/00* | (2015.01) | |

(52) U.S. Cl.
CPC ......... *C08G 18/6237* (2013.01); *C08G 18/12* (2013.01); *C08G 18/4063* (2013.01); *C08G 18/73* (2013.01); *C08G 18/755* (2013.01); *C08J 3/243* (2013.01); *C08L 75/14* (2013.01); *C09D 175/14* (2013.01); *B33Y 70/00* (2014.12); *B33Y 80/00* (2014.12); *C08L 2203/16* (2013.01); *C08L 2203/30* (2013.01); *C08L 2312/06* (2013.01)

(58) Field of Classification Search
CPC .... C09D 175/14; C08L 75/14; C08G 18/6237
See application file for complete search history.

(56) References Cited

U.S. PATENT DOCUMENTS

| | | | |
|---|---|---|---|
| 4,284,574 A | 8/1981 | Bagga | |
| 6,332,291 B1 | 12/2001 | Flosbach et al. | |
| 6,500,876 B2 | 12/2002 | Weikard et al. | |
| 6,949,591 B1 | 9/2005 | Allard et al. | |
| 9,540,477 B2* | 1/2017 | Tielemans | C08G 18/6659 |
| 2006/0229426 A1* | 10/2006 | Roesler | C08G 18/3206 |
| | | | 528/75 |
| 2017/0051096 A1* | 2/2017 | Lu | C08G 18/6204 |

FOREIGN PATENT DOCUMENTS

| | | | | |
|---|---|---|---|---|
| EP | 3 184 565 | | 6/2017 | |
| JP | 2019116591 A | * | 7/2019 | |
| WO | WO-2009147092 A1 | * | 12/2009 | C08G 18/10 |

OTHER PUBLICATIONS

JP_2019116591_Jul. 2019_English.*
International Search Report issued Oct. 4, 2019 in International (PCT) Application No. PCT/EP2019/067724.

* cited by examiner

*Primary Examiner* — Michael L Leonard
(74) *Attorney, Agent, or Firm* — WENDEROTH, LIND & PONACK, L.L.P.

(57) ABSTRACT

The present invention provides a radiation curable composition comprising a hydroxyl functional urethane (meth)acrylate compound (A) having an hydroxyl value between 10 and 80 mg KOH/g and which is the reaction product of a hydroxyl functional (meth)acrylate compound (A1) obtained from the reaction a or b: a. at least one diepoxy functional compound (A11a) with a (meth)acrylate compound (A11b) comprising at least one (meth)acrylate group and one carboxylic acid functional group or b. a carboxylic acid functional compound (A12a) comprising two carboxylic acid groups with an epoxy (meth)acrylate compound (A12b) comprising one glycidyl group and at least one (meth)acrylate group, with a diisocyanate functional compound (A3), and optionally a compound (A2) different of compound (A1) comprising two hydroxyl groups. Such composition is useful for example for dual curable compositions or for thick pigmented systems.

14 Claims, No Drawings

RADIATION CURABLE COMPOSITION

The present invention relates to a radiation curable composition that can be used in special applications such as in a dual cure coating compositions including thick pigmented systems, thermoforming applications and curing of 3D shaped articles.

"Dual cure" refers to compositions that can be cured by two curing mechanisms, such as radiation and thermal crosslinking. Such compositions require exposure to both radiation (like UV-radiation or other actinic radiation) and heat to achieve the degree of crosslinking necessary to obtain desired performance properties. Thus, in one aspect, the coating compositions of the invention may be at least partially curable upon exposure to radiation. In another aspect of the invention, whether independent or complementary to the first aspect, the coating compositions of the invention may be at least partially thermally curable upon exposure to heat energy.

Said dual cure coating composition is useful for example in thermoforming or in-mold decoration applications.

Radiation cure of thick pigmented systems is often challenging as the light cannot penetrate deep enough (deep curing) because of the light screening effect of the pigments. Thus in another aspect, a composition of the present invention can be advantageously used for thick pigmented systems.

Radiation curing of 3D shaped substrates is also a challenge in the so called shadow areas which are hidden from the UV light. Present invention can offer a solution to cure 3D substrates by combining radiation and thermal curing crosslinking mechanisms.

As will be demonstrated in the examples, the composition is also useful for radiation cured or dual cured coatings requiring excellent resistance to stains for example to household stains.

Radiation curable compositions are typically compositions comprising at least one ethylenically unsaturated compound i.e. a compound having ethylenically unsaturated groups (also named functions or functionalities) which can undergo radical polymerization. The polymerizable ethylenically unsaturated groups are generally chosen from acrylate or methacrylate groups, collectively named as "(meth) acrylate" groups. Acrylate groups are generally preferred over methacrylate groups. Radical polymerization is generally obtained through application of light radiation (typically UV light) often with help of a photoinitiator thereby the common designation of "radiation curable compositions". However, alternatively such "radiation curable compositions" can also be polymerized without UV radiation, for example through the action of peroxides or electron beam.

Generally, good surface properties require a high crosslinking density of the coating. However, high crosslinking densities result in thermosetting behavior with maximum possible degrees of stretching of just a few percent, so that the coating has a tendency towards cracking during the forming operation which can be problematic especially for thermoforming applications. This conflict between the required high crosslinking density and the desired high degree of stretch can be resolved in different ways, for example by carrying out curing in two steps, before and after forming. A radiation-induced crosslinking reaction is particularly suitable for post-curing.

(Meth)acrylated compounds comprising hydroxyl groups, for example oligomer compounds, are of interest in dual cure systems. Typically this kind of compounds, that can be cured both by heat or actinic radiation are useful in applications to coat objects of complicated shape. In addition to photopolymerization, they can also rely on a curing mechanism independent of irradiation, for example a crosslinking reaction of polyisocyanates with polyols. Another application taking advantage of such dual curing coating mechanism is the curing of highly pigmented coatings where the UV light cannot penetrate deep enough in the coating.

U.S. Pat. No. 6,500,876 describes a coating composition comprising: a) urethane (meth)acrylates that contain (meth) acryloyl groups and free isocyanate groups, b) urethane (meth)acrylates that contain (meth)acryloyl groups and free hydroxyl groups, c) a ultraviolet initiator that initiates radical polymerization and d) optionally, one or more compounds that react with isocyanates. It is said that such compositions have a substantially improved curing especially in unexposed areas.

U.S. Pat. No. 6,332,291 describes a coating composition which is curable by means of high-energy radiation, comprising:
A) oligomeric or polymeric compounds having a number average molecular weight of 300 to 1000, one or more free-radically polymerizable double bonds, and at least one further functional group reactive in a reaction selected from the group consisting of an addition reaction and a condensation reaction,
B) oligomeric or polymeric compounds having a number average molecular weight of 300 to 1000, one or more free-radically polymerizable double bonds, and at least one additional functional group reactive in a reaction selected from the group consisting of an addition reaction and a condensation reaction, wherein the additional reactive functional group is complementary to or reactive towards the further reactive functional groups of component A),
C) at least one compound selected from the group consisting of monomeric, oligomeric, and polymeric compounds having at least one functional group reactive for the purposes of a reaction selected from the group consisting of an addition reaction and a condensation reaction with the functional groups from component A) or component B),
D) one or more photoinitiators as well as
E) optionally, at least one of solvents, water, pigments, extenders and conventional lacquer additives,
wherein component A) and component B) differ from each other and component C) contains no free-radically polymerizable double bonds.

The coating compositions are useful for the production of multilayer lacquer coatings, in particular automotive repair lacquer coatings.

U.S. Pat. No. 6,949,591 describes a coating material curable thermally and with actinic radiation, comprising (a1) at least one constituent containing (a11) at least two functional groups which serve for crosslinking with actinic radiation, and if desired (a12) at least one functional group which is able to undergo thermal crosslinking reactions with a complementary functional group (a22) in the constituent (a2), and (a2) at least one constituent containing (a21) at least two functional groups which serve for crosslinking with actinic radiation, and (a22) at least one functional group which is able to undergo thermal crosslinking reactions with a complementary functional group (a12) in the constituent (a1), and also optionally one or more members selected from the group consisting of (a3) at least one photoinitiator, (a4) at least one thermal crosslinking initiator, (a5) at least one reactive diluent curable thermally and/or with actinic radiation, (a6) at least one coating additive, and/or (a7) at least one thermally curable constituent, with the proviso that the coating material contains at least one thermally curable constituent (a7) if the constituent (a1) has no functional group (a12). The coating material is used to seal sheet molded compounds and bulk molded compounds.

It is still desirable to provide compositions that are able to form cured coatings able to fulfill at least one of the following requirements: 1) Simple application by conventional methods to a film or a film composite, 2) Thermal curing via a polyaddition mechanism which results in a block-resistant coated film that can be-post-formed using appropriate tools, 3) final curing of the surface coating on the formed, coated film by radiation, the properties of the coating that are achieved being comparable with those which can be obtained by conventional surface coating of already formed objects.

In a first aspect, the invention provides a radiation curable composition comprising a hydroxyl functional urethane (meth)acrylate compound (A) having an hydroxyl value between 10 and 80 mg KOH/g and which is the reaction product of a hydroxyl functional (meth)acrylate compound (A1) obtained from the reaction a or b:
  a. at least one diepoxy functional compound (A11a) with a (meth)acrylate compound (A11b) comprising at least one (meth)acrylate group and one carboxylic acid functional group or
  b. a carboxylic acid functional compound (A12a) comprising two carboxylic acid groups with an epoxy (meth)acrylate compound (A12b) comprising one glycidyl group and at least one (meth)acrylate group, with a diisocyanate functional compound (A3), and optionally a compound (A2) different of compound (A1) comprising two hydroxyl groups.

Such radiation curable composition is useful to obtain excellent stain resistance coatings.

The invention further provides a radiation and thermally curable composition comprising:
  (I) at least one hydroxyl functional urethane (meth)acrylate compound (A) as defined above,
  (II) at least one isocyanate functional compound (B) comprising at least one isocyanate group and optionally at least one (meth)acrylate group,
  (III) optionally at least one compound (C) different from compound (A) which compound (C) comprises at least two hydroxyl groups suitable for polyaddition with compound (B) and optionally comprises at least one (meth)acrylate group,
  (IV) optionally at least one (meth)acrylate compound (D) which is substantially free of any chemical group reactive to hydroxyl groups of compounds (A) and (C) and to isocyanate group of compound (B).

The specific hydroxyl functional urethane (meth)acrylate as defined above has advantageous characteristics and permits to provide desirable properties as will appear herein below.

Such radiation and thermally curable composition permits to provide a composition which demonstrates advantageous characteristics in combination including:
  formation of a cured composition, for example a coating, showing good blocking resistance and high elongation characterized in that a degree of stretch of at least 100% can be achieved without crack formation after a thermal curing step and after subsequent radiation curing, and/or
  high adhesion to polymeric substrates and excellent chemical, hydrolysis and abrasion resistance of the cured composition.

These characteristics are useful and necessary for the preparation of dual curable inks, or coatings for thermoforming applications and other applications where such properties in combination are useful.

A radiation and thermally curable composition according to the invention permits to provide a surface-coating system for the coating of a post-formable film that fulfills together the following requirements:
  1) simple application by conventional methods to a film or a film composite,
  2) thermal curing via a polyaddition mechanism which results in a block-resistant coated film that can be-post-formed using appropriate tools, and
  3) final curing of the surface coating on the formed, coated film by radiation, the fastness properties of the coating that are achieved being comparable with those which can be obtained by conventional surface coating of already formed objects.

The present invention also extends to the use of the herein defined curable compositions for dual cure applications, for conformal coating, for composites, for three dimensional (3D) applications, for thick pigmented systems, for thermoforming, for dual curable inks, for thermoformable inks and/or for molding applications.

A radiation curable composition according to the present invention can be used in a thermoforming or molding process for producing a shaped article by molding or thermoforming a substrate, film or foil. For example, a substrate, film or foil is coated with the curable composition as herein defined, thermoformed and the thermoformed article is subsequently exposed to actinic radiation.

The invention also extends to a substrate, film or foil printed or coated with a herein defined curable composition.

The invention also provides a coated, post-formable film consisting of a substrate film and at least one coating formed from a herein defined surface-coating composition. The invention further provides a combined method for curing the surface-coating compositions and for post-forming. The urethane (meth)acrylate (A) of the present invention is formed by the reaction of hydroxyl functional diepoxy (meth)acrylate compounds (A1) and optionally a dihydroxy functional compound (A2) with a diisocyanate functional compound (A3).

The equivalent ratio of isocyanate groups of compound (A3) to hydroxyl groups of compound (A1) and optionally compound (A2) to prepare urethane (meth)acrylate compound (A) is preferably from 1:1, 1 to 1:2 more preferably from 1:1, 15 to 1:1, 5 and even more preferably from 1:1, 2 to 1:1, 4. Typically, the equivalent ratio of isocyanate groups to hydroxyl groups stands for the ratio of the amount of substance of isocyanate groups in equivalent and the amount of substance of hydroxyl groups in equivalent normalized on one for the isocyanate group. The urethane (meth)acrylate compound (A) is preferably substantially free from isocyanate groups which means that the amount of the isocyanate groups in urethane (meth)acrylate (A) is at most 0.015 meq/g.

The urethane (meth)acrylate (A) of present invention comprising free hydroxyl groups has preferably at least one free hydroxyl group.

The hydroxyl groups of urethane (meth)acrylate (A) may react during the curing of the radiation curable composition for instance with further isocyanate group containing compounds (B) such as polyisocyanates (B1) or isocyanate group containing urethane (meth)acrylates (B2). This can be the case in particular when the urethane (meth)acrylate compound (A) is used in two components (2K) compositions.

Usually, a two components (2K) composition contains a first component having both radiation curable groups, such as (meth)acrylate double bonds, and chemical crosslinkable groups, such as hydroxyl, in one container. A second component contains a corresponding crosslinking agent having crosslinking groups, such as isocyanate groups and is stored in a second container. Just prior to use, the first component and the second component are mixed to form a pot mix. In the context of the invention, the urethane (meth)acrylate compound (A) used in two-component composition is admixed to a second component which is at least one polyisocyanate compound (B).

According to a preferred embodiment, the hydroxyl value of the urethane (meth)acrylate compound (A) may be comprised between 10-80 mg KOH/g, preferably between 15-80 mg KOH/g and more preferably from 20 to 70 mg KOH/g of solid material. The hydroxyl value (also named 1OH) is expressed in mg KOH per gram. It is typically measured by derivatisation of the hydroxyl function with a reactant. In particular, it corresponds to the ratio of the mass of potassium hydroxide mKOH having the same number of hydroxyl groups as the sample, and the mass m of that sample. All the hydroxyl number values which are indicated are based on the dry matters (also named solid material).

The urethane (meth)acrylate compound (A) has preferably a number average molecular weight which is at least 1500 g/mol, preferably at least 2000 g/mol, more preferably at least 2500 g/mol. Preferably, the number average molecular weight of compound (A) is from of 1500 to 20000 g/mol, more preferably 2000 to 10000 g/mol, even more preferably 2500 to 5000 g/mol.

The urethane (meth)acrylate compound (A) may have an amount of ethylenically unsaturated groups from 0.5 to 3.5, preferably from 1 to 3.2 and more preferably from 1.5 to 3 milli-equivalent per gram of solid material.

Preferably, compound (A) has a number average molecular weight of 1500 to 20000 g/mol, a hydroxyl value between 10 and 80 mg KOH/g and an amount of ethylenically unsaturated groups comprised between 0.5 and 3.5 milli-equivalent per gram of solid material.

In one embodiment, the epoxy (meth)acrylate compound (A1) used to prepare urethane (meth)acrylate compound (A) can be prepared in a conventional manner by reacting the corresponding diepoxy compound (A11a) with at least one compound (A11b) containing at least one (meth)acrylate group and at least one carboxylic acid functional group, preferably in a near-equinormal ratio of from 1:0.9 to 1:1.1. Such method is described in U.S. Pat. No. 4,284,574.

The diepoxy compound (A11a) is for example conventional aliphatic, cycloaliphatic or aromatic diepoxy compound. Preferably compound (A1) comprises at least one aliphatic or aromatic cycle.

Examples of such diepoxy compounds (A11a) include diglycidyl ethers or di-(β-methylglycidyl) ethers, obtainable by reaction of a compound having two alcoholic hydroxyl groups with epichlorohydrin or β-methylepichlorohydrin under alkaline conditions or in the presence of an acidic catalyst with subsequent alkali treatment. The diglycidyl ethers of this type are derived for example from aliphatic alcohols, such as ethylene glycol, diethylene glycol or higher poly(oxyethylene) glycols, propane-1,2-diol or poly(oxypropylene) glycols, propane-1,3-diol, butane-1,4-diol, poly(oxytetramethylene) glycols, pentane-1,5-diol, hexane-1,6-diol. Other glycidyl ethers of this type are derived from cycloaliphatic alcohols, such as 1,4-cyclohexanedimethanol, bis(4-hydroxycyclohexyl)methane, 2,2-bis(4-hydroxycyclohexyl)-propane or tricyclodecanedimethanol. Other glycidyl ethers may also be derived from aromatic alcohols such as bisphenol A or F, resorcinol, 4-methylcatechol and their alkoxylated derivatives N,N-bis-(2-hydroxyethyl)aniline and 4,4'-bis(2-hydroxyethylamino)diphenylmethane. Diepoxy compounds (A11a) comprises also cyclic epoxy derivatives such as bis(2,3-epoxycyclopentyl) ether, 2,3-epoxycyclopentylglycidyl ether, 1,2-bis(2,3-epoxycyclopentyloxy) ethane. Preferably diepoxy compounds (A11a) are cycloaliphatic epoxide compounds such as glycidyl ethers from 1,4-cyclohexanedimethanol, bis(4-hydroxycyclohexyl)methane, 2,2-bis(4-hydroxycyclohexyl)-propane or tricyclodecanedimethanol. Compound (A11a) preferably derived from cycloapliphatic alcohols. Most preferably compound (A11a) is hydrogenated Bisphenol A diglycidyl ether (HBADGE).

Examples of compounds (A11b) comprising at least one (meth)acrylate group and at least one carboxylic acid functional group include (meth)acrylic acid, 2-Carboxyethyl acrylate, reaction products of hydroxy-functional acrylates or methacrylates with anhydrides or dicarboxylic acid compounds. Examples of hydroxy-functional acrylates or methacrylates include compounds such as 2-hydroxyethyl (meth)acrylate, polyethylene oxide mono(meth)acrylates, polypropylene oxide mono(meth)acrylates, polyalkylene oxide mono(meth)acrylates, poly("epsilon"-caprolactone) mono(meth)acrylates, such as, for example, Tone® M100 (Dow, USA), polylactide mono(methy)acrylates, 2-hydroxypropyl (meth)acrylate, 4-hydroxybutyl (meth)acrylate, 3-hydroxy-2,2-dimethylpropyl (meth)acrylate, 3-methacryloyloxy-2-hydroxypropyl methacrylate, 3-acryloyloxy-2-hydroxypropyl methacrylate, the hydroxy-functional mono-, di- or tetra-(meth)acrylates of polyhydric alcohols such as trimethylolpropane, glycerol, pentaerythritol, dipentaerythritol, ethoxylated, propoxylated or alkoxylated trimethylolpropane, glycerol, pentaerythritol, dipentaerythritol or commercial mixtures thereof. Anhydride or dicarboxylic acid compounds include phthalic acid (anhydride), hexahydrophthalic acid (anhydride), tetrahydrophthalic acid (anhydride), tetrachlorophthalic acid (anhydride), hexachlorophthalic acid (anhydride), tetrabromophthalic acid (anhydride), succinic acid (anhydride), maleic acid (anhydride), fumaric acid, itaconic acid (anhydride), adipic acid, sebacic acid and oxalic acid. Preferably compound (A11b) is (meth)acrylic acid or reaction product of a poly("epsilon"-caprolactone) mono(meth)acrylates with an anhydride.

In another embodiment, the epoxy (meth)acrylate compound (A1) used to prepare urethane (meth)acrylate (A) is obtained by reaction of a difunctional carboxylic acid functional compound (A12) with an epoxy (meth)acrylate compound (A12b) comprising one glycidyl group and at least one (meth)acrylate group, for example glycidyl (meth)acrylate. Suitable difunctional carboxylic acid compounds include aliphatic dicarboxylic acid compounds such as fumaric acid, maleic acid, hexahydrophthalic acid or adipic acid or aromatic diacid compounds such as terephtalic acid or phtalic acid. Preferably an aliphatic dicarboxylic acid compound is used.

In the preparation of urethane (meth)acrylate (A), the epoxy (meth)acrylate compound (A1) can be partially replaced by a compound (A2) containing two hydroxyl groups but which is not containing an ethylenically unsaturated double bond. Suitable compounds (A2) include low molecular weight, short-chained, i.e. containing from 2 to 20 carbon atoms, aliphatic, aralphatic or cycloaliphatic diols. Examples of diols are ethylene glycol, diethylene glycol, triethylene glycol, tetraethylene glycol, dipropylene glycol, tripropylene glycol, 1,2-propanediol, 1,3-propanediol, 1,4- butanediol, neopentyl glycol, 2-ethyl-2-butylpropanediol, trimethylpentanediol, position-isomeric diethyloctanediols, 1,3-butylene glycol, cyclohexanediol, 1,4-cyclohexanedimethanol, 1,6-hexanediol, 1,2- and 1,4-cyclohexanediol, hydrogenated bisphenol A (2,2-bis(4-hydroxycyclohexyl) propane), 2,2-dimethyl-3-hydroxypropionic acid (2,2-dimethyl-3-hydroxypropyl ester). Preference is given to aliphatic diols, very particularly preferably cycloaliphatic diols. Also suitable are higher molecular weight aliphatic and cycloaliphatic polyols, such as polyester polyols, polyether polyols, polycarbonate polyols, or corresponding hybrids. Preference is given to (cyclo)aliphatic polyester polyols and/or (cyclo)aliphatic polycarbonate polyols, with very particular preference being given to those polyester, polycaprolactone, polylactide and/or polycarbonate polyols that contain linear aliphatic diols.

The amount of (A2) relative to the total amount of (A1)+(A2) is preferably not more than 50%, more preferably not more than 30% w % (weight procent). Preferably, compound (A1) is present in at least 50 w %, relative to the total amount of compounds (A1) and (A2).

Suitable diisocyanate compounds (A3) in the preparation of urethane (meth)acrylate (A) include (cyclo)aliphatic, arylaliphatic and aromatic diisocyanates. Examples of aromatic di-isocyanates that may be used are 1,4-diisocyanatobenzene (BDI), 2,4-diisocyanatotoluene (toluene diisocyanate (TDI)), 1,1'-methylenebis[4-isocyanatobenzene] (MDI), xylilene diisocyanate (XDI), 1,5-naphtalene diisocyanate (NDI), tolidine diisocyanate (TODI), tetramethylxylylene diisocyanate (TMXDI) and p-phenylene diisocyanate (PPDI). Other examples of polyisocyanates that may be used in the context of the invention are trimethyl 1,6 hexamethylene diisocyanate, 4,4'-diisocyanatodicyclohexylmethane, 4,4'-diisocyanatodiphenylmethane, the technical mixtures with 2,4-diisocyanatodiphenylmethane and also the higher homologues of above mentioned diisocyanates, 2,4-diisocyanatotoluene and technical mixtures of them with 2,6-diisocyanatotoluene, as well as the copolymerization product of 3-isopropenyl-a,a'-dimethylbenzyl isocyanate (TMI). Examples of aliphatic and cycloaliphatic di-isocyanates are 1,6-diisocyanatohexane (HDI), 1,1'-methylene bis[4-isocyanatocyclohexane] (H12MDI), 5-isocyanato-1-isocyanatomethyl-1,3,3-trimethyl-cyclohexane (isophorone diisocyanate, IPDI).

Preferred in the context of the invention are aliphatic and/or cycloaliphatic di-isocyanates. Particularly preferred are aliphatic or cycloaliphatic diisocyanates and more particularly cycloaliphatic diisocyanates. Especially preferred are 1,6-diisocyanatohexane (HDI) and/or isophorone diisocyanate (IPDI).

Urethane (meth)acrylate compound (A) can be used with or without solvent. Due to its high viscosity preferably urethane (meth)acrylate compounds (A) are diluted with a solvent. Examples of organic solvents usable are glycol ethers, such as dipropylene glycol dimethyl ether, ethylene glycol dimethyl ether; glycol ether esters, such as ethylene glycol monoethyl ether acetate, ethylene glycol monobutyl ether acetate, diethylene glycol monobutyl ether acetate, methoxypropyl acetate; esters, such as butyl acetate, isobutyl acetate, amyl acetate; ketones, such as methyl ethyl ketone, methyl isobutyl ketone, diisobutyl ketone, cyclohexanone, isophorone; aromatic hydrocarbons, such as xylene, Solvesso® 100 (mixture of aromatic hydrocarbons with a boiling range of 155 to 185° C.), Solvesso® 150 (mixture of aromatic hydrocarbons with a boiling range of 182 to 202° C.) and (cyclo)aliphatic hydrocarbons.

The urethane (meth)acrylate compound (A) may also comprise at least one radical inhibitor. Examples of suitable radical inhibitors for use during the urethanization step include phenolic stabilizers such as but not limited to hydroquinone (HQ), methyl hydroquinone (THQ), tert-butyl hydroquinone (TBHQ), di-tert-butyl hydroquinone (DTBHQ), hydroquinone monomethyl ether (MEHQ), 2,6-di-tert-butyl-4-methylphenol (BHT) and the like. Other examples of suitable inhibitors include phosphines, like triphenylphosphine (TPP), and tris-nonylphenylphosphite (TNPP), phenothiazine (PTZ), triphenyl antimony (TPS), and any mixtures thereof. The total amount of inhibitor used is generally from 0 to 1% by weight of the urethane (meth)acrylate compound (A), preferably from 0.005% to 0.5% by weight, most preferably from 0.01% to 0.1% by weight of compound (A).

The urethane (meth)acrylate compound (A) may also comprise at least one catalyst to facilitate the urethanization reaction between the isocyanate groups and the hydroxyl groups. For instance, a catalyst may be used when reacting hydroxyfunctional compounds (A1) and optional compound (A2) with the diisocyanate compound (A3). The catalyst may be metal salts from Tin, Bismuth, Zirconium, Zinc or mixtures thereof. Preferred catalysts are dibutyltin dilaurate, tin carboxylates, bismuth carboxylate and bismuth/zinc carboxylates. An amine catalyst can also be used, alone or in conjunction with the above metallic catalysts. Suitable amine catalysts include for instance 1,4-diazabicyclo[2,2,2] octane (DABCO). The catalyst may be used, for example, in amounts from 0.005% (50 ppm) to 0.5% (5000 ppm) based on the total weight of urethane (meth)acrylate compound (A).

Preferably the isocyanate functional compound (B) comprises a isocyanate compound containing at least 1 free isocyanate group.

As isocyanate functional compounds (B), aromatic, araliphatic, aliphatic and cycloaliphatic polyisocyanates may be used. The isocyanate compound (B) may or may not contain ethylenically unsaturated compounds. Preferably, compound (B) contains at least one (meth)acrylate group.

The at least one isocyanate compound (B) concerns compounds with free isocyanate group(s). Isocyanate compounds containing free isocyanate group(s) are, for example, any organic isocyanates with aliphatically, cycloaliphatically, araliphatically and/or aromatically bound free isocyanate group(s). Isocyanates of this kind are known to the skilled person and described in the literature.

The (poly)isocyanates used are preferably those with an average isocyanate functionality from 0.5 to 5, preferably 1 to 4, most preferably 1.5 to 3.

These (poly)isocyanate compounds (B) may or may not contain ethylenically unsaturated double bonds. Suitable (poly)isocyanate compounds (B1) not containing ethylenically unsaturated double bonds include so called "paint (coating) polyisocyanates", for example, those based on hexamethylene diisocyanate (HDI), 1-isocyanato-3,3,5-trimethyl-5-isocyanatomethyl-cyclohexane (I PDI) and/or bis(isocyanatocyclohexyl)-methane and the known derivatives of these diisocyanates containing biuret, allophanate, urethane and/or isocyanurate groups from which excess starting diisocyanate is removed after their preparation, preferably by distillation, to a residual content of less than 0.5 wt. %.

Sterically hindered polyisocyanates are also suitable. Examples thereof are 1, 1, 6, 6-tetramethyl-hexamethylene diisocyanate, 1,5-dibutyl-pentamethyl diisocyanate, p- or m-tetramethylxylylene diisocyanate and the corresponding hydrogenated homologues.

In principle, diisocyanates may be reacted in the conventional manner to higher functionality compounds, for example, by trimerization or by reaction with water or polyols such as, trimethylolpropane or glycerol.

Isocyanate-modified resins, e.g., NCO-functional (meth) acrylate, polyurethane, polyester and/or epoxy resins may be used in addition to or instead of the above-mentioned polyisocyanates as polyisocyanate compound.

The at least one polyisocyanate compound (B1) may include oligomeric polyisocyanates including, but not limited to, dimers, such as the uretdione of 1,6-hexamethylene diisocyanate, trimers, such as the biuret and isocyanurate of 1,6-hexanediisocyanate (Desmodur N 3300 commercially available from Covestro) and the isocyanurate of isophorone diisocyanate, and polymeric oligomers. Modified polyisocyanates can also be used, including, but not limited to, carbodiimides and uretdiones, and mixtures thereof. Examples of preferred polyisocyanates are those containing biuret, isocyanurate and/or iminooxadiazinedione structures. In particular, the polyisocyanate compound (B1) can be an aliphatic, aliphatic/cycloaliphatic and/or cycloaliphatic single-type or mixed trimers based on 1,6-diisocyanatohexane and/or isophorone diisocyanate.

It is also possible to use the above-mentioned polyisocyanate compounds (B1) partially reacted with isocyanate-reactive ethylenically unsaturated compounds such as hydroxyl functional (meth)acrylate compounds to form isocyanate group containing urethane (meth)acrylate compounds (B2).

There are used for this purpose preferably α,β-unsaturated carboxylic acid derivatives, such as acrylates, methacrylates, maleates, fumarates, maleimides, acrylamides, as well as vinyl ethers, propenyl ethers, allyl ethers and dicyclopentadienyl-unit-containing compounds which have at least one group reactive towards isocyanates; these are particularly preferably acrylates and methacrylates having at least one isocyanate-reactive group. There come into consideration as hydroxy-functional acrylates or methacrylates, for example, compounds such as 2-hydroxyethyl (meth) acrylate, polyethylene oxide mono(meth)acrylates, polypropylene oxide mono(meth)acrylates, polyalkylene oxide mono(meth)acrylates, poly("epsilon"-caprolactone) mono (meth)acrylates, such as, for example, Tone® M100 (Dow, USA), 2-hydroxypropyl (meth)acrylate, 4-hydroxybutyl (meth)acrylate, 3-hydroxy-2,2-dimethylpropyl (meth)acrylate, 3-methacryloyloxy-2-hydroxypropyl methacrylate, 3-acryloyloxy-2-hydroxypropyl methacrylate, the hydroxy-functional mono-, di- or tetra-(meth)acrylates of polyhydric alcohols such as trimethylolpropane, glycerol, pentaerythritol, dipentaerythritol, ethoxylated, propoxylated or alkoxylated trimethylolpropane, glycerol, pentaerythritol, dipentaerythritol or commercial mixtures thereof. In addition, isocyanate-reactive oligomeric or polymeric unsaturated acrylate and/or methacrylate-group-containing compounds, on their own or in combination with the above-mentioned monomeric compounds, are suitable. Examples of polyisocyanate compounds partially reacted with isocyanate reactive ethylenically unsaturated compounds are for instance Ebecryl® 4150, Ebecryl® 4250, Ebecryl® Ebecryl® 4396, Ebecryl® 4397, Ebecryl® 4510, Ebecryl® 4765 and Ebecryl® 4141, all commercially available from allnex. Suitable compounds (B2) are also described in EP3184565.

It is optionally also possible to use the above-mentioned isocyanates (B) partially reacted with blocking agents known to the person skilled in the art from coating technology. Examples of blocking agents which may be mentioned include: alcohols, lactams, oximes, malonic esters, alkyl acetoacetates, triazoles, phenols, imidazoles, pyrazoles and amines, such as, for example, butanoneoxime, diisopropylamine, 1,2,4-triazole, dimethyl-1,2,4-triazole, imidazole, malonic acid diethyl ester, acetic acid ester, acetone oxime, 3,5-dimethylpyrazole, epsilon-caprolactam, N-tert-butylbenzylamine, cyclopentanone carboxyethyl ester or any desired mixtures of these blocking agents.

Compound (B) can be used as such or diluted with one of the above described organic solvents.

All above mentioned isocyanate compounds (B1) and (B2) can be used individually or in any desired mixtures.

As optional component (C) high molecular weight polyols can be used with a number average molecular weight in the range of 500 to 10000 g/mol, preferable from 700 to 4000 g/mol.

When present, component (C) is preferably present in an amount of up to 50 w %, preferably less than 50 w %, more preferably less than 40 w %, more preferably less than 30 w % towards the weight of components (A)+(C).

These include for example polyester alcohols based on aliphatic, cycloaliphatic and/or aromatic dicarboxylic acids with diols as well as lactone-based polyester alcohols. Also suitable are polyetherols which are obtainable by polymerisation of cyclic ethers or by reaction of alkylene oxides with a starter molecule. Also suitable are hydroxyl-terminated polycarbonates, which are obtainable by reaction of diols or lactone-modified diols or bisphenols, such as e.g. bisphenol A, with phosgene or carbonic acid diesters, such as diphenyl carbonate or dimethyl carbonate. Hydroxyl-terminated polyamide alcohols and hydroxyl-terminated polyacrylate diols can also be used.

Optional component (D) can be one or more monomeric or polymeric compounds that carry at least one functional group. Such group is reacts with ethylenically unsaturated compounds under the action of actinic radiation, during the polymerization (curing). Preferred are those that are liquid at room temperature. Some examples of suitable compounds are given below.

The radiation curable composition can also contain lower molecular weight (meth)acrylated monomers such as (meth) acrylic acid, beta-carboxyethyl acrylate, butyl(meth)acrylate, methyl(meth)acrylate, isobutyl (meth)acrylate, 2-ethylhexyl(meth)acrylate, cyclohexyl (meth)acrylate, n-hexyl (meth)acrylate, isobornyl (meth)acrylate, isooctyl (meth) acrylate, n-lauryl (meth)acrylate, octyl/decyl (meth)acrylate, phenoxyethyl(meth)acrylate, nonylphenolethoxylate mono (meth)acrylate, 2-(2-ethoxyethoxy)ethyl(meth)acrylate, 2-butoxyethyl (meth)acrylate, 1,6-hexanediol di(meth)acrylate, 3(4),8(9)-bis-(hydroxymethyl)-tricyclo-[5.2.1.02'6]decane di(meth)acrylate, di or tri propylene glycol di(meth) acrylate, ethoxylated and/or propoxylated neopentylglycoldi (meth)acrylate, isosorbide di(meth)acrylate, and ethoxylated and/or propoxylated derivatives thereof, bisphenol A di(meth)acrylate and the ethoxylated and/or propoxylated derivatives thereof, trimethylolpropanetri(meth)acrylate and the ethoxylated and/or propoxylated derivatives thereof, di-trimethylolpropanetri(meth)acrylate, glyceroltri(meth)acrylate and the ethoxylated and/or propoxylated derivatives thereof, pentaerythritoltriacrylate (PETIA) and the ethoxylated and/or propoxylated derivatives thereof, dipentaerythritol penta or hexaacrylate and the ethoxylate and/or propoxylated derivatives thereof.

Examples of (meth)acrylated oligomers that can be used in the present invention include amino (meth)acrylate oligomers, polyester (meth)acrylates, (poly)urethane (meth)acrylates and epoxy (meth)acrylates. Once more the acrylated forms are preferred. The oligomers are preferably having a molecular weight of from 500 to 5000 Daltons. The oligomer typically comprises at least 2 functional groups per molecule.

Polyester (meth)acrylate oligomers are well known. These (meth)acrylated polyesters can be obtained by reacting a hydroxyl group-containing polyester backbone with (meth)acrylic acid, or by reacting a carboxyl group-containing polyester backbone with a hydroxy functional alkyl (meth)acrylate such as for example 2-hydroxyethyl acrylate, 2- or 3-hydroxypropyl acrylate, etc. or with glycidyl (meth)acrylate. The polyester backbone can be obtained in a conventional manner by polycondensation of at least one polyhydroxy alcohol, such as ethylene glycol, propylene glycol, butanediol, neopentyl glycol, hexanediol, trimethylolpropane, bisphenol A, pentaerythritol, etc, or/and the ethoxylates and/or propoxylates thereof, with at least one polycarboxylic acid or anhydride thereof such as adipic acid, phthalic acid, isophthalic acid, terephthalic acid, trimellitic acid, etc. By using unsaturated compounds for the polyester synthesis, such as for example fumaric acid, maleic acid, itaconic acid, etc., polyesters bearing both (meth)acrylic and ethylenic unsaturations in the polymer chain, can be obtained. In addition polylactones and/or polylactides can be used as polyester backbone. For example poly(ε-caprolactone), polylactide and/or poly(lactide,caprolactone) can beobtained by ring-opening polymerization of ε-caprolactone and/or lactide optionally in the presence of one or more polyhydroxy alcohols. Preferred are the polyester (meth)acrylate oligomers commercialized as EBECRYL® 450, EBECRYL® 452, EBECRYL® 657, EBECRYL® 837, EBECRYL® 895, EBECRYL® 810, EBECRYL® 830, EBECRYL® 854 and EBECRYL® 870 all available from Allnex.

Polyether (meth)acrylate oligomers can be prepared by esterification of hydroxyfunctional polyethers with (meth)acrylic acid. Hydroxyfunctional polyethers can be obtained by ring-opening homo- or copolymerization of cyclic ethers such as tetrahydrofuran, ethylene oxide and/or propylene oxide, or can be prepared by reacting polyhydroxy alcohols with ethylene and/or propylene oxide.

Polycarbonate (meth)acrylate oligomers are known. They can be prepared by esterification of hydroxyfunctional polycarbonates with (meth)acrylic acid.

Urethane (meth)acrylate oligomers can be prepared by reacting a di- and/or polyisocyanate, such as hexamethylene-diisocyanate, isophorone-diisocyanate, toluene-diisocyanate, with hydroxyl functional (meth)acrylate. Use can be made exclusively of hydroxyl functional (meth)acrylates such as those mentioned above, but in order to extend the chain, mono- or polyhydroxy alcohols can also be added, such as those mentioned above for the synthesis of polyesters polyesters, polyethers or polycarbonates containing hydroxyl groups. Most preferred are urethane acrylates commercialized as EBECRYL® 220, EBECRYL® 2220, EBECRYL® 1290, EBECRYL® 1290N, EBECRYL® 1291, EBECRYL® 220, EBECRYL® 270, EBECRYL® 264, EBECRYL® 294/25HD, EBECRYL® 8254, EBECRYL® 4680, EBECRYL® 4513, EBECRYL® 8465, EBECRYL® 4654, EBECRYL® 4666, EBECRYL® 4738, EBECRYL® 4740, EBECRYL® 4883, EBECRYL® 5129, EBECRYL® 8210, EBECRYL® 8602, EBECRYL® 8415, EBECRYL® 225 all available from Allnex.

By epoxy (meth)acrylate oligomers is meant to designate the (meth)acrylic esters of epoxides, preferably polyepoxides, i.e. compounds comprising at least one, preferably at least two epoxide functions. Epoxy (meth)acrylate oligomers are generally obtained from the reaction of (meth)acrylic acid with epoxides. The epoxides are generally chosen from epoxidized olefins, glycidyl esters of saturated or unsaturated carboxylic acids, glycidyl ethers of aromatic or aliphatic alcohols or polyols and from cycloaliphatic polyepoxides. Preferred epoxides are diglycidylethers of aromatic and aliphatic diols and cycloaliphatic diepoxides such as diglycidyl ether of bisphenol-A, diglycidyl ether of bisphenol-F, diglycidylether of poly(ethylene oxide-co-propylene oxide), diglycidylether of polypropylene oxide, diglycidylether of hexanediol, diglycidylether of butanediol. Particularly preferred is diglycidyl ether of bisphenol-A. Also epoxidized natural oils or epoxidized phenol-formaldehyde copolymers can be used. Examples of natural oils include soybean oil, linseed oil, *perilla* oil, fish oil, dehydrated castor oil, tung oil, coconut oil, corn oil, cottonseed oil, olive oil, palm oil, palm kernel oil, peanut oil, sunflower oil, safflower oil, castor oil. Examples of suitable epoxy acrylates include EBECRYL® 600, EBECRYL® 860, EBECRYL® 3420, EBECRYL® 608, EBECRYL® 3608, EBECRYL® 3702, EBECRYL® 3701, EBECRYL® 3700, all available from Allnex.

Optionally amino (meth)acrylates can be added as such to the composition of the invention. Examples of suitable amino (meth)acrylates include EBECRYL® 7100, EBECRYL® 80, EBECRYL® 81, EBECRYL® 83, EBECRYL® 85, EBECRYL® LEO 10551, EBECRYL® LEO 10552 & EBECRYL® LEO 10553, all available from Allnex.

The coating composition according to present invention may also comprise at least one photochemical initiator capable of initiating the polymerization of the radiation curable polymer composition under UV light. Photochemical initiators (also called photoinitiators) are compounds that can generate radicals by absorption of light, typically UV light.

The amount of photoinitiator in the radiation curable composition is preferably comprised between 0.1% and 10% by weight, more preferably between 1 and 5% by weight based on the total weight of the radiation curable composition of the invention. The radiation curable composition according to the invention may also comprise from 0 to 5% by weight of one or more photosensitizers well known in the art. Alternatively, the composition can be cured in the absence of an initiator, especially by electron beam. Examples of suitable photoinitiators may be α-hydroxyketones, α-aminoketones, benzildimethyl-ketals, acyl phosphines, benzophenone derivatives, thioxanthones and blends of these and more preferably is selected from the group consisting of α-hydroxyketones, benzophenone, acyl phosphines and any mixtures thereof and most preferably is selected from the group consisting of hydroxyketones, acyl phosphines and any mixtures thereof.

The coating composition of the invention may optionally also comprise inert or functional resins, pigments, carbon black, colorants, fillers, nanoparticles and/or other additives suitable to improve the application of the formulated composition on a substrate and including not limitatively wetting agents, antioxidants, flow modification agents, slip agents, fire retardant agents, UV-protection agents, adhesion promoters, rheology modifiers, leveling agents, wetting agents, slip additives, stabilizers, metallic fillers, anti-foam agents, alkoxysilanes, water and mixtures thereof. The total amount of pigments, carbon black, colorants, inert resins, fillers and/or additives in the radiation curable composition of the invention generally does not exceed 60% by weight, preferably it does not exceed 40% by weight.

The coating composition of the invention may optionally comprise at least one pigment and/or at least one matting agent.

The at least one pigment may be an inorganic pigment and selected from the group consisting of: titanium oxide, zinc oxide, antimony oxide, calcium carbonate, fumed silica, aluminium oxide and any mixture thereof. According to one embodiment, the at least one pigment may be an organic pigment and selected from the group consisting of: acid and base dye pigments, diazo pigments, monoazo pigment, phthalocyanine pigments, carbon black, quinacridone pigments metallic effect pigment and any mixtures thereof.

The at least one matting agent may preferably be an inorganic matting agent, in particular an inorganic oxide matting agent. Preferred matting agents are selected from the group consisting of: $SiO_2$, $Al_2O_3$, $AlPO_4$, $MgO$, $TiO_2$, $ZrO_2$, $Fe_2O_3$ and mixtures thereof. The oxides may be in a variety of forms, including gelled, precipitated, fumed, colloidal, etc. Inorganic oxides may also include natural minerals, processed/activated minerals, montmorillonite, attapulgite, bentonite, diatomite, quartz sand, limestone, kaolin, ball clay, talc, pyrophyllite, perlite, sodium silicate, sodium aluminum silicate, magnesium silicate, magnesium aluminum silicate, silica hydrogel, silica gel, fumed silica, precipitated silica, dialytic silica, alumina zeolite, molecular sieves, diatomaceous earth, reverse phase silica, bleaching clay, and mixtures thereof.

The coating composition of present invention may also comprise a catalyst for accelerating the reaction between the hydroxyfunctional urethane (meth)acrylate compound (A) and isocyanate functional component (B). The catalyst may be metal salts from Tin, Bismuth, Zinc or mixtures thereof. Preferred catalysts are dibutyltin dilaurate, tin carboxylates, bismuth carboxylates or bismuth/Zinc carboxylates. An amine catalyst can also be used, alone or in conjunction with the above metallic catalysts. Suitable amine catalysts include for instance 1,4-diazabicyclo[2,2,2]octane (DABCO). The catalyst may be used, for example, in amounts from 0.005% (50 ppm) to 1% (10000 ppm) based on the total weight of compounds (A), (B) and optionally compounds (C) and (D).

Suitable solvents that can be used in the dual cure coating composition are solvents that are inert with respect to isocyanate groups and double bonds (ethylenic unsaturations), such as esters, ketones, ethers, ether esters, alkanes or aromatic solvents. The amount of the solvent in the radiation curable composition is from 0 wt. % to 80 w %, more preferably from 5 wt. % to 70 w % and most preferably from 10 wt. % to 60 wt. % based on the total weight of compounds (A), (B) and optional compounds (C) and (D).

When preparing coating composition according to present invention all the constituents of the coating composition can be formulated as one component, though in this case the system has a limited pot life. A preferred type of formulation is, however, a two-component system, component I containing constituent (A) and optionally compounds (C), (D) and component II containing compound (B). The respective components are then storage-stable as long as the constituents themselves. Both components are mixed in the specified ratio prior to application or applied by means of so-called two-component systems. As soon as the two packs are mixed, the isocyanates groups start to react with the hydroxyl group leading to a slow, continuous and not reversible reaction. The time during which the radiation curable composition can be used is defined as "pot life". The pot life of a specific radiation curable composition is typically determined empirically. The end of the pot life is usually achieved once the initial viscosity of the ready to use formulation has doubled. End users can also employ if desired dual head spray gun to facilitate handling: in such conditions formulation pot life is enhanced and the two components are mixed after spray application.

In the radiation curable composition of present invention the urethane (meth)acrylate compound (A) and optional hydroxy functional compound (C) is combined with polyisocyanate compound (B). The equivalent ratio of the isocyanate groups of compound (B) to the hydroxyl groups of compound (A) and optional compounds (C) is from 0.2:1 to 1.3:1, more preferably from 0.5:1 to 1.2:1, even more preferably from 0.7:1 to 1.15:1, most preferably from 0.8:1 to 1.1:1.

The coating system according to the invention is preferably a dual cure coating composition. "Dual cure" refers to compositions that can be cured by two curing mechanisms, such as thermal and radiation crosslinking. This can be done simultaneously or in alternation. It is possible, for example, to begin with thermal curing and end with actinic radiation curing. In another cases it may be favorable to begin with actinic radiation and to end with thermal curing. The sequence to be used is determined by the general knowledge of a skilled worker.

Radiation curing is accomplished preferably by exposure to high-energy radiation, i.e. UV radiation or daylight, e.g. light with a wavelength of 172 to 750 nm, or by bombardment with high-energy electrons (electron beams, 70 to 300 keV). Various types of actinic radiation can be used such as ultraviolet (UV) radiation, gamma radiation, and electron beam. A preferred means of radiation curing is ultraviolet radiation. According to one embodiment, the UV radiations are UV-A, UV-B, UV-C and/or UV-V radiations.

Examples of suitable radiation sources for light or UV light include high-pressure mercury vapor lamps, it being possible for the mercury vapor to have been modified by doping with other elements such as gallium or iron. Lasers, pulsed lamps (known under the designation UV flashlight lamps), halogen lamps or excimer lamps, high or low pressure gallium lamps, mercury lamps, cold cathode tubes, xenon lamps, black lights, UV Low energy ultraviolet light sources (LED), a UV laser and a flash light may be used as well.

The lamps may be installed stationary, so that the material to be irradiated is moved past the radiation source by means of a mechanical apparatus, or the lamps may be mobile and the material for irradiation does not change its location during the cure. The radiation dose that is normally sufficient for crosslinking in the case of UV curing is situated in the range from 0.1 to 2000 mJ/cm2.

Irradiation can where appropriate also be carried out in the absence of oxygen, such as under an inert gas atmosphere or oxygen-reduced atmosphere, for example. Suitable inert gases are preferably nitrogen, carbon dioxide, noble gases or combustion gases. Irradiation can also take place with the coating covered with media that are transparent to the radiation. Examples thereof are, for example, polymeric films, glass or liquids.

The radiation curable composition according to the present invention allows obtaining coatings with satisfying properties on different kinds of substrate. The radiation curable compositions of the invention can be applied by the customary techniques to any of a very wide variety of substrates, such as by spraying, rolling, knife coating, pouring, spraying, brushing, impregnating, dipping, printing or other transfer methods, for example. Preferably the radiation curable compositions of the invention can be applied by spray or roller application. Suitable substrates are, for example, wood, ceramic, composite, metal, including in particular metal as used in the applications known as wire, coil, can or container coating, and also plastic, especially ABS, ABS/PC, AMMA, ASA, CA, CAB, EP, UF, CF, MF, MPF, PC, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviations in accordance with DIN 7728T1), paper, leather, textiles, felt, glass, concrete, glass reinforced composite materials, inorganically bonded substrates such as wood cement boards and asbestos cement boards, electronic component assemblies or mineral substrates. It is also possible to paint substrates which are composed of different materials from among those stated, or substrates which have already been coated. A further possibility is to apply the radiation curable composition to a substrate only temporarily, then to cure them partly or fully and to detach them again, in order for example to produce sheets, films or foils, in particular plastic foils. The radiation curable composition may be used in the coating of vehicles, in particular automotive bodies or add-on parts, preferably in the form of clear coats.

The method of curing of the radiation curable composition according to present invention can be carried out according to the following steps:
  step 1: flashing off optionally added solvents, preferably at room temperature or at elevated temperature, preferably up to 80° C., optionally also by means of a stream of heated gas (e.g. air). The temperature increase may be brought about by known methods such as infrared or near-infrared radiators or by ovens heated in other ways,
  step 2: thermal curing by crosslinking the NCO-containing constituents with the isocyanate-reactive compounds, and
  step 3: radiation curing with for example radiation sources as ultraviolet (UV) radiation, gamma radiation, or electron beam The thermal curing can be carried out at elevated temperature, but advantageously below 150° C. The temperature may be increased by known methods such as infrared or near-infrared radiators or by ovens heated in other ways. When post-curing is complete, a cooling phase may follow before the coated articles undergo further handling.

For general dual cure applications, the radiation cure and thermal cure may occur sequentially or concurrently. Either radiation cure or thermal cure may occur first. In one embodiment, the radiation curable compositions of the invention will first be subjected to radiation (like UV radiation), followed by a second stage of cure, wherein the radiation curable compositions previously subjected to radiation (like UV radiation) curing, will be subjected to a thermal cure (usually for 3D parts).

In another preferred embodiment according to present invention, the two-stage curing process is achieved by first reaction in present coating composition the isocyanate and hydroxyl groups by means of forced drying (circulating air or IR) and further downstream polymerization of the thermally cured coating composition by means of a radiation source (like UV light). Such a curing sequence allows intermediate processing of the coated articles as used in thermoforming and high pressure forming of coated films, in-mold-decoration (IMD), in-mold-film (IMF), in-mold-label (IML) and in-mold-coating (IMC).

Substrate films for the coating composition used in a thermoformable coating application according to the invention must possess above all the necessary thermal formability. In principle, therefore, thermoplastic polymers; in particular polyacrylates, polymethacrylates, thermoplastic polyurethanes, polyesters, polyethers, polyolefins, polyamides, copolymers of different polymers and blends of different polymers are suitable.

Thermoplastic polyurethanes, polymethyl methacrylate (PMMA), and modified variants of PMMA, Polyethylene Terephtalate Glycol modified (PETG), polycarbonates, acrylstyrene-acrylonitrile copolymers (ASA) and mixtures of these polymers are particularly suitable.

The substrate film is preferably used in the form of films having a thickness of from 50 to 5000 μm, preferably from 200 to 2000 μm. The polymer of the substrate layer can optionally contain additives, such as, for example, stabilizers, fillers, such as fibers, and colorings.

On the rear side of the substrate film, that is to say on the surface to which the coating composition is not applied, a thermally formable adhesive layer can optionally be applied. There are suitable therefor, depending on the procedure, melt adhesives or radiation-curing adhesives. In addition, a protective film, which is likewise thermally formable, can be applied to the surface of the adhesive layer.

The film can optionally additionally be coated with thermoplastic surface-coating layers, for example adhesive primers, color- and/or effect-giving base lacquers. The coating composition according to the invention is then not applied directly to the film but to the thermoplastic surface-coating layers, which have already been applied by conventional methods and dried.

The invention relates also to a combined method for curing the surface-coating compositions and for post-forming the coating composition according to the invention.

The coating composition according to the invention is first applied to the substrate film (film) by conventional methods such as knife application, roller application, spraying or printing. The applied layer thicknesses (before curing) are typically from 0.5 to 5000 μm, preferably from 5 to 1000 μm, particularly preferably from 10 to 200 μm. When solvents are used, they are removed by conventional methods after application. This is followed by a first curing step, in which a thermal polyaddition reaction is initiated. Owing to the defined functionality of compounds (A) and (B) and optional compounds (C) and (D) of the coating composition, a block-resistant coating is thereby formed.

A thermally formable protective film can optionally be applied to the coated surface before or after the first curing step, in particular when the substrate film used has an adhesive layer on the surface facing the coated surface.

After the first curing step, the coated film can optionally be rolled up, without the coating adhering to the rear side of the substrate film. It is, however, also possible to cut the coated film to size and to feed the cut sections to further processing either individually or in a pile.

After the first curing step, or optionally after rolling up, the coated film can be brought into the desired final form by thermal forming. This can be effected according to conventional processes such as deep-drawing, vacuum forming, pressing, blow moulding. In addition, the coated film can optionally be used in the heated state for coating objects. An adhesive layer can optionally be inserted as adhesion promoter between the film and the object to be coated.

After the forming step, the coating of the coated film is finally cured by irradiation with actinic radiation. Radiation curing is preferably carried out by the action of high-energy radiation with radiation sources as mentioned before.

Before or after final curing, the formed coated film can be modified by spraying or applying a foam to the back thereof using optionally filled polymers, such as thermoplastics, or reactive polymers, such as two-component polyurethane systems. An adhesive layer can optionally be used as adhesion promoter.

The formed coated films or molded bodies produced therefrom can be used in principle in the same manner as uncoated films or films coated after forming. In particular, transparent or partially transparent formed coated films can be used in the production of screens, indicators or displays in electronic devices. They can further be used as labels or signs, for example having partially raised or depressed regions, such as, for example, motor vehicle number plates, but also in the production of credit cards or other cards in which the three-dimensional structure is used as a security feature. Furthermore, they can be used as a replacement for embossed metal, for example for high-quality packaging.

The molded bodies which have been sprayed on the back or had foam applied to the back can in principle likewise be used as appropriately formed, coated or uncoated plastics parts. The molded bodies according to the invention can then advantageously be used in particular when a plastics component, owing to its function, requires the advantageous properties (appearance, resistance, fastness to scratching and wear) of a high-quality surface coating, but subsequent surface coating is dispensed with for reasons of cost. Such applications are in particular casings for small electronic devices, such as mobile telephones or telephones, shavers and computers, in particular portable devices which are exposed to particular stresses. The molded bodies are advantageously used in motor vehicle or aircraft construction, in particular as add-on parts for motor vehicles or bodywork parts.

The invention will now be described in more details in the examples below, which in no way are intended to be limited.

EXAMPLES

Experimental Data

List of Materials

ABS: Acrylonitrile butadiene styrene, Magnum 3616, Dow
PC: Polycarbonate, Lexan 9030, Sabic.
ABS/PC: Bayblend T85, Bayer
AA: acrylic acid, monomer, BASF
Veralite® 200: thermoformable plastic sheet based upon PETG (Glycol modified Polyethylene Terephthalate), IPB
Eponex® 1510, hydrogenated bisphenol A diglycidyl ether, Hexion
BAC: butyl acetate, solvent, Celanese.
IPDI: isophorone diisocyanate, Evonik
HDI: hexamethylene diisocyanate, Covestro
Desmodur® N 3300: Aliphatic polyisocyanate (HDI trimer), Covestro.
PETIA: pentaerythritol triacrylate, allnex.
Eternacoll® PH100: copolycarbonate diol, UBE
Eternacoll® PH200D: copolycarbonate diol, UBE
Eternacoll® PH300D: copolycarbonate diol, UBE
EBECRYL® 1200: acrylate functional acrylic resin, allnex
EBECRYL® 4510: isocyanate functional urethane acrylate, allnex
BHT: butylated hydroxytoluene, stabilizer, Innochem.
MeHQ: Hydroquinone Monomethyl Ether, stabilizer, Innochem
Hycat OA: catalyst, Dimension Technology Chemical Systems, Inc.
PTZ: phenothiazine, Allessa
Valikat ZB8: PU catalyst, Umicore.
Additol® CPK: 1-hydroxy-cyclohexylphenyl-ketone, photoinitiator, Allnex.
DBTL: dibutyl tin dilaurate, catalyst, Vesta Intracon.
Modaflow® 9200: Acrylic flow modifier, without silicone addition, Allnex.
Tegowet® 270, polyether siloxane copolymer, Evonik
Syloid MX 309: silica matting agent, Grace
Acematt OK 520: wax treated silica matting agent, Evonik
Lanco™ PP 1362 D: Modified Polypropylene Wax, Lubrizol The Measurements were Done According to Following Standards Hydroxyl values (1OH in mg KOH/g) were measured using the following method. This "OH Number" method covers the automated quantification procedure for hydroxyl groups by means of potentiometric titration. The hydroxyl number is defined as the number of milligrams of potassium hydroxide required to neutralize the hydrolysis product of the fully acetylated derivative prepared out of one gram of -resin. Step 1-Acetylation step: All hydroxyl functions are acetylated at 75° C. by acetic chloride. Step 2-Hydrolysis step: The excess of acetic chloride is hydrolyzed by a solution of N-methyl-2-pyrrolidone (NMP) in water. Step 3-Titration step: The formed acid functions are titrated with KOH 0.5 N solution.

The viscosity of the resin is measured at a fixed shear rate with a cone and plate type rheometer MCR100 (Paar-Physica) according to DIN EN ISO 3219, 25 1/s; 23° C.

The number-average molecular weight (Mn) was determined by conventional gel permeation chromatography (GPC) with Polystyrene standards EasyCal from Polymer Laboratories (Molecular Weight range: 200-400.000 g/mol). The sample was dissolved (1.0% wt./wt.) in tetrahydrofuran (THF) containing 0.5% toluene as Flow rate marker. Analysis were performed by liquid chromatography (Merck-Hitachi L7100) equipped with 3 PLGel Mixed-D LS polystyrene divinylbenzene GPC columns (300×7.5 mm×5 μm). The components of the sample were separated by the GPC columns based on their molecular size in solution and detected by a Refractive Index detector. Data were gathered and processed by Polymer Laboratories Cirrus GPC software.

Preparation of Urethane Acrylate (A) According to the Present Invention

Step 1: Preparation of epoxy acrylate (A1): 363.5 g of Eponex® 1510, 0.48 g BHT and 0.36 g Hycat OA were charged into a reaction flask equipped with an agitator, liquid addition funnel and thermometer. This mixture was heated at 95° C. An addition funnel is filled with a mixture of 120.4 g AA, 0.48 g MeHQ and 0.36 g Hycat OA which was added dropwise to the reaction flask over a period of 2 hours so that the temperature in the reaction flask does not exceed 105° C. After all AA was added, the reaction mixture was further stirred at 110° C. until the acid value was lower than 1 mg KOH/g and the epoxy value was lower than 0.27%.

Step 2—Preparation of urethane acrylate (A): Epoxy acrylate (A1) prepared in step 1 was cooled down to 60° C. and 396 g BAC, 0.2 g Valikat ZB8 and 0.15 g of PTZ was added and stirred for 15 minutes. After this 107.5 g HDI was added in 3 different portions and the reaction mixture was subsequently further reacted until a specific isocyanate content of not more than <0.1% was reached. The product had a hydroxyl value of 50 mg KOH/g on solids, a viscosity of 1450 mPa·s measured at 25° C. and a number average molecular weight of 2940 g/mol.

Example 2: similar as example 1 but with IPDI instead of HDI.

Example 3-5, similar as example 1 but with different ratio's between HDI and the epoxy acrylate (A1) resulting in urethane acrylates with a different number average molecular weight.

Examples 6 and 7 are similar as example 1 but respectively 20 and 50 w % of polycarbonate diol (Eternacoll PH100) was used together with respectively 80 w % and 50 w % of the epoxy acrylate.

The types and amounts of reagents used to prepare synthesis examples 1-7 are summarized in Table 1

The types and amounts of reagents used to prepare synthesis comparative examples 4-5 are summarized in Table 2.

TABLE 2

|  |  | Comp Ex 4 | Comp Ex 5 |
|---|---|---|---|
| Step 1 | Epoxy acrylate (A1) | 486.3 | 486.3 |
| Step 2 | Butylacetate | 324.4 | 372.1 |
|  | Valikat ZB8 | 0.2 | 0.2 |
|  | hexamethylene diisocyanate | — | 71.7 |
|  | Hydroxy value (mg KOH/g on solid material) | 186 | 98 |
|  | Viscosity mPa,s at 25° C. | 300 | 88 |
|  | Number average Mw (g/mol) | 815 | 1815 |
|  | Double bond content (meq/g on solid material) | 3.44 | 3 |
|  | Physical drying | no | no |

Preparation of Isocyanate Functional Urethane Acrylate (B)

Synthetic example 8: 371 g of PETIA, 429 g Desmodur N3300, 200 g BAC together with 100 ppm of PTZ was charged in a reaction flask equipped with a mechanical

TABLE 1

|  |  | Ex 1 | Ex 2 | Ex 3 | Ex 4 | Ex 5 | Ex 6 | Ex 7 |
|---|---|---|---|---|---|---|---|---|
| Step 1 | Epoxy acrylate (A1) | 486.3 | 486.3 | 486.3 | 486.3 | 486.3 | 486.3 | 486.3 |
| Step 2 | BAC | 396.0 | 418.6 | 400.8 | 404.0 | 388.1 | 486.6 | 758.1 |
|  | Valikat ZB8 | 0.2 | 0.2 | 0.2 | 0.2 | 0.2 | 0.2 | 0.2 |
|  | Eternacoll PH 100 |  |  |  |  |  | 121.6 | 486.3 |
|  | HDI | 107.5 |  | 114.7 | 119.5 | 95.6 | 121.7 | 164.3 |
|  | IPDI |  | 141.4 |  |  |  |  |  |
|  | Hydroxy value (mg KOH/g on solid material) | 50 | 48 | 43 | 37 | 68 | 47 | 45 |
|  | Viscosity mPa, s at 25° C. | 1450 | 1820 | 2350 | 3100 | 850 | 1400 | 1550 |
|  | Number average molecular weight (g/mol) | 2940 | 2935 | 3510 | 3940 | 2420 | 3445 | 3845 |
|  | Double bond content (meq/g on solid material) | 2.82 | 2.67 | 2.79 | 2.76 | 2.88 | 2.29 | 1.47 |
|  | Physical drying | yes | yes | yes | yes | no | no | no |

In comparative examples 1 and 2 the urethane (meth) acrylate according to present invention was exchanged with a polycarbonate diol compound respectively Eternacoll PH200D and Eternacoll PH300D. Eternacoll PH200D and Eternacoll PH300D do not contain an acrylate functionality and have a number average molecular weight of respectively 2000 and 3000 g/mol and a hydroxy value of respectively 58 and 39 mg KOH/g.

Comparative example 3 was EBECRYL® 1200 which is an acrylate functional acrylic resin supplied in 45% by weight of BAC with a number average molecular weight of 6420 g/mol and a hydroxy value on solid material of 200 mg KOH/g. EBECRYL® 1200 is physical drying.

Comparative example 4 was epoxy acrylate (A1) from step 1 diluted with BAC with no further reaction with a diisocyanate and number average molecular weight of 815 g/mol.

In comparative example 5 the epoxy acrylate (A1) was reacted with HDI and had a number average molecular weight of 1815 g/mol.

stirrer, a condenser and gas in and outlet. The reactants were stirred in air atmosphere at room temperature and afterwards heated to 60° C. and held for 18 hours. The product had a viscosity of 1600 mPa·s at 25° C. and an isocyanate content of 6.2%.

As a second isocyanate functional urethane acrylate EBECRYL® 4510 is taken. EBECRYL® 4510 had a viscosity of 20000 mPa·s at 23° C. and an isocyanate content of 7%.

Resin Evaluation

Preparation of the Radiation Curable Composition—2K Composition

Radiation curable compositions F1 to F10 according to the invention and comparative radiation curable composition Comp F1 to F6 were prepared by using the amounts and the type of compounds as summarized in table 3, 4 and 5.

TABLE 3 formulation examples F1-F6

| Amounts in grams | | Ex F1 | Ex F2 | Ex F3 | Ex F4 | Ex F5 | Ex F6 |
|---|---|---|---|---|---|---|---|
| Component I | Synth Ex 1 | 76.9 | | | | | |
| | Synth Ex 2 | | 78.2 | | | | |
| | Synth Ex 3 | | | 80.8 | | 82.4 | |
| | Synth Ex 4 | | | | 83.5 | | |
| | Synth Ex 5 | | | | | | 70.8 |
| | BAC | 5 | 5 | 5 | 5 | 5 | 5 |
| | DBTL | 0.02 | 0.02 | 0.02 | 0.02 | 0.02 | 0.02 |
| | Modaflow ®9200 | 0.5 | 0.5 | 0.5 | 0.5 | 0.5 | 0.5 |
| | Tegowet ® 270 | 0.8 | 0.8 | 0.8 | 0.8 | 0.8 | 0.8 |
| | Additol ® CPK | 3 | 3 | 3 | 3 | 3 | 3 |
| Component II | Synt Ex 8 | 23.1 | 21.8 | 19.2 | 16.5 | | 29.2 |
| | EBECRYL 4510 | | | | | 17.6 | |
| | BAC | | | | | 5 | |

TABLE 4 formulation examples F7-F10

| Amounts in grams | | Ex F7 | Ex F8 | Ex F9 | Ex F10 |
|---|---|---|---|---|---|
| Component I | Synth Ex 3 | | | 62.6 | 37.4 |
| | Synth Ex 6 | 78.2 | | | |
| | Synth Ex 7 | | 80.8 | | |
| | Eternacoll PH200D/BAC (60/40) | | | 15.7 | 37.4 |
| | BAC | 5 | 5 | 5 | 5 |
| | DBTL | 0.02 | 0.02 | 0.02 | 0.02 |
| | Modaflow ® 09200 | 0.5 | 0.5 | 0.5 | 0.5 |
| | Tegowet ® 270 | 0.8 | 0.8 | 0.8 | 0.8 |
| | Additol ® CPK | 3 | 3 | 3 | 3 |
| Component II | Synt Ex 8 | 21.8 | 19.2 | 21.7 | 25.2 |

In formulation ex 9 and 10 an extra polyol compound C was added being a difuntional polycarbonate diol (Eternacoll PH200D).

TABLE 5 comparative formulation examples F1-F6

| Amounts in grams | | Comp F1 | Comp F2 | Comp F3 | Comp F4 | Comp F5 | Comp F6 |
|---|---|---|---|---|---|---|---|
| Component I | Eternacoll PH200D/BAC (60/40) | 69.7 | | | | | |
| | Eternacol PH300D/BAC (60/40) | | 63.6 | | | | |
| | EBECRYL 1200 | | | 42.1 | 80 | | |
| | Comp Ex 4 | | | | | 61.4 | |
| | Comp Ex 5 | | | | | | 33.6 |
| | BAC | 5 | 5 | 5 | 5 | 5 | 5 |
| | DBTL | 0.02 | 0.02 | 0.02 | 0.02 | 0.02 | 0.02 |
| | Modaflow ®9200 | 0.5 | 0.5 | 0.5 | 0.5 | 0.5 | 0.5 |
| | Tegowet ® 270 | 0.8 | 0.8 | 0.8 | 0.8 | 0.8 | 0.8 |
| | Additol ® CPK | 3 | 3 | 3 | 3 | 3 | 3 |
| Comp. II | Synth Ex 8 | 30.3 | 36.4 | 57.9 | 20 | 38.6 | 66.4 |

Assessment of the Properties of the Radiation Curable Compositions

Films were prepared with the radiation curable compositions. The coating layers were applied on substrates using a bar coater. Solvent flash off and thermal treatment was done in a ventilated oven at 80° C. for 30 min. The target coating thickness after solvent flash is 15 µm. Directly after the thermal treatment step the coatings were evaluated on being touch dry and blocking resistance.

Thermoforming was assessed on Veralite 200 substrate after storage of one week at room temperature.

Other properties (Film appearance, adhesion, abrasion resistance, scratch resistance, hydrolysis resistance, hand crème and sun tan lotion resistance) were tested on substrates that were thermally treated in ventilated oven at 80° C. and subsequently cured under UV lights at a cure speed of 2×5 m/min using a 120 Watt/cm$^2$ Hg lamps. Prior to the testing the substrates were stored for 1 week at room temperature. Substrates used are PC, ABS, ABS/PC. All the films obtained show nice, clear aspect without defects, before and after the oven and after UV curing.

The properties of the radiation curable compositions were assessed according to the following methods:

Tackiness and film sticking after solvent evaporation and before curing: a film with a dry coating thickness of 15 µm is applied on a PC film and thermally treated for 30 minutes in oven at 80° C. Tackiness is evaluated by a finger pressing on top of the film surface. The results are recorded in a 1-5 scale: 0=wet/1=very tacky/2=tacky/3=slightly tacky/4=dust free-finger print/5=tack free. A 5 score corresponds to a tack free film, when no visible marks appear on the surface. In addition film stickiness is evaluated after two films are put on contact and separate from each other. The results are recorded in a 0-3 scale: 0=very strong stickiness/1=strong stickiness/2=slightly stickiness/3=no stickiness.

Blocking resistance: a film with a dry coating thickness of 15 µm is applied on a PC film and thermally treated for 30 minutes in an oven at 80° C. After cooling down and storage of the cured sample, surfaces are put face to face on their coated sides for 2 hours in an oven at 45° C. with pressure of 1 kg on a surface of 6 cm diameter. Rating for the blocking resistance is recorded in a 0-5 scale: 5=no blocking, no defect/4=little bit of blocking but no defect/3=minor defect/2=major defect/1=cannot be separated.

Thermoformability: a film with a dry coating thickness of 15 µm is applied on Veralite 200 substrate and thermally treated for 30 minutes in an oven at 80° C. After cooling down and storage of the substrate at room temperature the substrate is tested on its thermoformability using a mold (massive cylinder with diameter of 4.5 cm and a height of respectively 3.5 and 8 cm corresponding to approximately a maximum elongation of respectively 150%, 250% and 300%) in a thermoforming plant (vacuum former 725 FLB). After the film being thermoformed the coating is evaluated on its aspect and rated from 1 to 5: 5—no defects, 4—few small cracks, 3—lot of small cracks, 2—large cracks and coating delamination at zone with largest elongation, 1—large cracks and delamination over the full moulded area.

Film appearance (transparency): the transparency of the coating is assessed on the difference aspect. The results are rated visually and recorded in a 1-5 scale: 5=fully transparent; 4=very slightly hazy; 3=slightly hazy; 2=hazy; 1=opaque. A high value (5) is expected to provide the best appearance and functionality of the coated object.

Adhesion (cross hatch tape): The adhesion on ABS, PC and ABS/PC is assessed using the cross-cut test according to ISO 2409. 5 cuts of ~1 cm long and spaced by ~1 mm are made in the coating using a knife, followed by 5 similar cuts in the transversal direction. The adhesion was measured using an adhesive tape (Scotch®) firmly pressed on the cross-cut coating and removed rapidly; the damage to the cross-cut surface area of the coating due to adhesion loss is expressed in a 0-5 scale, 5=best. A high adhesion is necessary to ensure a strong permanent bond between the coating and the substrate.

Hand cream and suntan lotion resistance: coating's resistance and cream and sun lotion is evaluated according to VW PV 3964. Sun cream and hand lotion are applied on a bandage and laid on the coating. Sample is placed in a ventilated oven for 24 hours at 80° C., the bandage is removed and the remnant of cream/lotion is wiped off with a tissue. The sample is left at least 4 hours at room temperature before evaluation. Coating is evaluated on visual damage and cross hatch adhesion after test. Test is passed when coating is not damaged and when same level of adhesion is achieved before and after the test.

Hydrolysis resistance: coating's resistance to hydrolysis is evaluated according to VW TL 226. The coating applied on a plastic substrate is place into a humidity chamber for 72 h, at 90° C., 95% relative humidity. Coating is evaluated on visual damage and cross hatch adhesion after humidity test. Test is passed when coating is not damaged and when same level of adhesion is achieved before and after the test.

Stain resistance: A product (Z) is put on the coating for a certain period of time (Y) and covered with a glass capping to prevent air drying. After time (Y) the product (Z) will be removed with a tissue drenched in solvent (S) or a water/soap solution. A scale from 1 to 5 is then used as following to determine and score the stain resistance (5: No visual stain, 4: very light stain, 3 moderate stain, 2: strong stain, 1: very strong stain. The following products (also called household stain marking substances) were tested

TABLE 6

| Z | Y | S |
|---|---|---|
| black marker (Artline 70 N) | 5 minutes | IPA |
| eosine | 16 hours | $H_2O$/detergent |
| Iso-betadine | 16 hours | $H_2O$/detergent |
| Ethanol/water (50/50) | 24 hours | Dry wipe |
| Red Wine | 24 hours | $H_2O$/detergent |
| Coffee | 24 hours | $H_2O$/detergent |
| NH3 (10%) | 24 hours | $H_2O$ |
| Mustard | 24 hours | $H_2O$/detergent |

Abrasion (taber Haze): coating's resistance to abrasion is assessed with taber haze according to ASTM D1044. Initial coating haze on PC is measured. The test specimen is then placed on the abrasion tester. A 500 gram load is placed on top of abrader wheel CS-10F and allowed to spin for a specified number of revolutions. A final haze measurement is taken and is compared to initial value. Abrasive damage is visually judged and numerically quantified by the difference in haze percentage in accordance with Test Method D1003 between an abraded and unabraded specimen. The lower the percent haze difference, the more resistant the coating is to abrasive damage.

Scratch resistance (steel wool on PC): the test is performed by scratching the coating with the steel wool for 5 double rubs. The results are rated visually and recorded in a 1-5 scale: 5=no scratch; 4=very light scratch; 3=moderate scratch; 2=strong scratch; 1=very strong scratch. A high value (5) is expected to provide the best protection against any deterioration of the coated object.

Properties of the thermally cured coating are given in table 7 and 8.

TABLE 7

| Compositions | Ex F1 | Ex F2 | Ex F3 | Ex F4 | Ex F5 | Ex F6 | Ex F7 | Ex F8 | Ex F9 | Ex F10 |
|---|---|---|---|---|---|---|---|---|---|---|
| Tack free/fingerprint film sticking | 5 | 5 | 5 | 5 | 5 | 5 | 5 | 5 | 5 | 3 |
| Blocking resistance | 3 | 3 | 3 | 3 | 3 | 3 | 3 | 3 | 3 | 1 |
| 45° C. Thermoforming | 5 | 5 | 5 | 5 | 4 | 5 | 5 | 4 | 5 | 5 |
| 8 cm (>300% elongation) | 4 | 4 | 5 | 5 | 5 | 2 | 5 | 3 | 4 | 3 |

TABLE 7-continued

| Compositions | Ex F1 | Ex F2 | Ex F3 | Ex F4 | Ex F5 | Ex F6 | Ex F7 | Ex F8 | Ex F9 | Ex F10 |
|---|---|---|---|---|---|---|---|---|---|---|
| 5 cm (200% elongation | 5 | 5 | 5 | 5 | 5 | 3 | 5 | 4 | 5 | 4 |
| 3 cm (150% elongation) | 5 | 5 | 5 | 5 | 5 | 5 | 5 | 5 | 5 | 5 |

TABLE 8

| Compositions | Comp F1 | Comp F2 | Comp F3 | Comp F4 | Comp F5 | Comp F6 |
|---|---|---|---|---|---|---|
| Tack free/fingerprint film sticking | 5 | 5 | 5 | 5 | 5 | 2 |
| Blocking resistance | 3 | 3 | 3 | 3 | 3 | 1 |
| 45° C. Thermoforming | 5 | 4 | 5 | 5 | 5 | 2 |
| 8 cm (>300% elongation) | 2 | 5 | 1 | 1 | 1 | 1 |
| 5 cm (200% elongation | 4 | 5 | 1 | 1 | 1 | 1 |
| 3 cm (150% elongation) | 5 | 5 | 1 | 1 | 2 | 1 |

We can conclude that coatings according to the present invention had good blocking resistance and good to excellent thermoformability. Comparative examples F3 and F4 based on EBECRYL 1200 having a high hydroxy value of 200 mg KOH/g (on solids) had very poor thermoformability. Comparative examples F5 and F6 had also bad thermoformability. These coatings were based on comparative synthesis examples 4 and 5 having also a high hydroxy value of respectively 186 and 98 mg KOH/g (on solids) and also a relatively low number average molecular weight respectively 815 g/mol and 1815 g/mol.

The properties of the UV cured coatings are given in tables 9 and 10:

TABLE 9

| Compositions | | Ex F1 | Ex F2 | Ex F3 | Ex F4 | Ex F5 | Ex F6 | Ex F7 | Ex F8 | Ex F9 | Ex F10 |
|---|---|---|---|---|---|---|---|---|---|---|---|
| Adhesion | — | | | | | | | | | | |
| PC sheet | Film appearance | 5 | 5 | 5 | 5 | 5 | 5 | 5 | 4 | 4 | 2 |
| | Adhesion (cross hatch tape) | 5 | 5 | 5 | 5 | 5 | 5 | 5 | 5 | 5 | 5 |
| Black ABS/PC | Film appearance | 5 | 5 | 5 | 5 | 5 | 5 | 5 | 4 | 4 | 2 |
| | Adhesion (cross hatch tape) | 5 | 5 | 5 | 5 | 5 | 5 | 5 | 5 | 5 | 5 |
| Black ABS | Film appearance | 5 | 5 | 5 | 5 | 5 | 5 | 5 | 4 | 4 | 2 |
| | Adhesion (cross hatch tape) | 5 | 5 | 5 | 5 | 5 | 5 | 5 | 5 | 5 | 5 |
| Hand cream resistance | — | | | | | | | | | | |
| PC sheet | Visual damage | no | no | no | no | no | no | no | no | no | yes |
| | Adhesion (cross hatch tape) | 5 | 5 | 5 | 5 | 5 | 5 | 5 | 5 | 5 | 5 |
| Black ABS | Visual damage | no | no | no | no | no | no | no | no | no | yes |
| | Adhesion (cross hatch tape) | 5 | 5 | 5 | 5 | 5 | 5 | 5 | 0 | 5 | 5 |
| Suntan lotion resistance | — | | | | | | | | | | |
| PC sheet | Visual damage | no | no | no | no | no | no | no | yes | no | yes |
| | Adhesion (cross hatch tape) | 5 | 5 | 5 | 5 | 5 | 5 | 5 | 5 | 5 | 5 |
| Black ABS | Visual damage | no | no | no | no | no | no | no | yes | no | yes |
| | Adhesion (cross hatch tape) | 5 | 5 | 5 | 5 | 5 | 5 | 5 | 5 | 5 | 5 |
| Hydrolysis resistance | — | | | | | | | | | | |
| PC sheet | Visual damage | no | no | no | no | no | no | no | no | no | no |
| | Adhesion (cross hatch tape) | 5 | 5 | 5 | 5 | 5 | 5 | 5 | 5 | 5 | 5 |
| Abrasion | | | | | | | | | | | |
| Scratch resistance (Steel wool 5 double rubs) | | 3 | 3 | 3 | 3 | 3 | 3 | 3 | 3 | 3 | 3 |
| Abrasion (Taber Haze) | 100 cycles | 5.4 | NA | 6.5 | 6.2 | 7.2 | 6.1 | 6.3 | 5.3 | 7.5 | 10.3 |
| | 300 cycles | 9.5 | NA | 11.8 | 10.9 | 11.5 | 10.4 | 12.0 | 9.9 | 12.5 | 14.4 |

TABLE 10

| Compositions | | Comp F1 | Comp F2 | Comp F3 | Comp F4 | Comp F5 | Comp F6 |
|---|---|---|---|---|---|---|---|
| Adhesion | — | | | | | | |
| PC sheet | Film appearance | 5 | 5 | 5 | 5 | 5 | 5 |
| | Adhesion (cross hatch tape) | 5 | 5 | 5 | 5 | 5 | 5 |
| Black ABS/PC | Film appearance | 5 | 5 | 5 | 5 | 5 | 5 |
| | Adhesion (cross hatch tape) | 5 | 5 | 5 | 0 | 5 | 5 |
| Black ABS | Film appearance | 5 | 5 | 5 | 5 | 5 | 5 |
| | Adhesion (cross hatch tape) | 5 | 5 | 5 | 5 | 5 | 5 |
| Hand cream resistance | — | | | | | | |
| PC sheet | Visual damage | no | no | no | no | no | no |
| | Adhesion (cross hatch tape) | 5 | 5 | 5 | 5 | 5 | 5 |
| Black ABS | Visual damage | yes | no | no | no | no | no |
| | Adhesion (cross hatch tape) | 4 | 5 | 5 | 5 | 5 | 5 |
| Suntan lotion resistance | — | | | | | | |
| PC sheet | Visual damage | yes | yes | no | no | no | no |
| | Adhesion (cross hatch tape) | NA | NA | 5 | 5 | 5 | 5 |
| Black ABS | Visual damage | yes | yes | no | no | no | no |
| | Adhesion (cross hatch tape) | NA | NA | 5 | 5 | 5 | 5 |
| Hydrolysis resistance | — | | | | | | |
| PC sheet | Visual damage | no | no | no | no | no | no |
| | Adhesion (cross hatch tape) | 5 | 5 | 0 | 0 | 5 | 5 |
| Abrasion | | | | | | | |
| Scratch resistance (Steel wool 5 double rubs) | | 3 | 3 | 4 | 3 | 3 | 3 |
| Abrasion (Taber Haze) | 100 cycles | 5.6 | NA | 5.2 | 5 | 5.2 | 5.1 |
| | 300 cycles | 10.8 | NA | 8.7 | 9 | 9.3 | 10.1 |

Thus examples 1-10 according to present invention showed outstanding adhesion to the different plastic substrates, a moderate to good level of scratch and abrasion resistance and were passing all challenging chemical resistance tests typically used in automotive interior namely: the hydrolysis, hand cream and suntan lotion resistance. ExF9 and F10 show that thermoforming properties are maintained when component (C) is present in the composition, but some properties are decreased when using large amounts of (C) (ExF10).

Comparative formulation examples F1 and F2 based on polycarbonate diols Eternacoll PH200D and Eternacoll PH 300D failed in the suntan lotion resistance test. Comparative example F3 and F4 based on EBECRYL 1200 lost adhesion in the hydrolysis test.

Resistance to typical household stains was evaluated on both formulation example F3 which is cured thermally and with UV and F11, F12 which are only cured with UV.

A coating of 10p dry is applied by bar coater on a white Leneta paper. After solvent flash off for 5 min at 80° C. for F11 and F12 or solvent flash off and thermal treatment for 30 min at 80° C. for F3 in a ventilated oven, the coating was cured under UV lights at a cure speed of 2×5 m/min using a 120 Watt/cm² Hg lamps. Prior to the testing the substrates were stored for 1 week at room temperature.

TABLE 11

| Amounts in grams | | Ex F3 | Ex F11 | Ex F12 |
|---|---|---|---|---|
| Component I | Synth Ex 3 | 80.8 | 100 | 100 |
| | BAC | 5 | 5 | 5 |
| | DBTL | 0.02 | | |
| | Syloid MX 309 | | | 5 |
| | Acematt OK 520 | | | 3 |
| | Lanco ™ PP 1362 D | | | 2 |
| | Modaflow ® 09200 | 0.5 | 0.5 | 0.5 |
| | Additol ® CPK | 3 | 3 | 3 |

TABLE 11-continued

| Amounts in grams | | Ex F3 | Ex F11 | Ex F12 |
|---|---|---|---|---|
| Component II | Synt Ex 8 | 19.2 | 0 | 0 |
| Gloss 20° | | 85.6 | 81.1 | — |
| Gloss 60° | | 92.9 | 93.8 | 18.4 |
| Gloss 85° | | — | — | 34 |
| | mustard | 5 | 5 | 5 |
| | eosine 2% | 5 | 5 | 5 |
| | coffee | 5 | 5 | 5 |
| | iso-betadine | 5 | 5 | 5 |
| | NH10% | 5 | 5 | 5 |
| | ethanol 50% | 5 | 5 | 5 |
| | N70 black marker | 5 | 4 | 3 |

The data of Table 11 shows that coatings prepared from the dual cure formulation F3 and formulation F11 which is only UV cured had an excellent stain and chemical resistance. Also when adding matting agents in F12 a good stain resistance was maintained.

The invention claimed is:

1. A non-aqueous radiation and thermally curable composition comprising:
   I. at least one hydroxyl functional urethane (meth)acrylate compound (A) having a hydroxyl value between 10 and 80 mg KOH/g and which is the reaction product of a hydroxyl functional (meth)acrylate compound (A1) obtained from the reaction of
      at least one diepoxy functional compound (A11a) with a (meth)acrylate compound (A11b) comprising at least one (meth)acrylate group and one carboxylic acid functional group
   with a diisocyanate functional compound (A3) selected from the group consisting of aliphatic and cycloaliphatic di-isocyanates,
   and optionally a compound (A2) different from compound (A1) comprising two hydroxyl groups,
   II. at least one isocyanate functional compound (B) comprising at least one isocyanate group and at least one (meth)acrylate group, III. optionally at least one compound (C) different from compound (A) which compound (C) comprises at least two hydroxyl groups suitable for polyaddition with compound (B) and optionally comprises at least one (meth)acrylate group, and IV. optionally at least one (meth)acrylate compound (D) which is substantially free of any chemical group reactive to hydroxyl groups of compounds (A) and (C) and to isocyanate group of compound (B).

2. The curable composition according to claim 1, wherein compound (A) has a number average molecular weight of 1500 to 20,000 g/mol and an amount of ethylenically unsaturated groups comprised between 0.5 and 3.5 milli-equivalent per gram of solid material.

3. The curable composition according to claim 1, wherein compound (A1) comprises at least one aliphatic or aromatic cycle.

4. The curable composition according to claim 1, wherein compound (A11a) is a cycloaliphatic epoxy compound.

5. The curable composition according to claim 4, wherein compound (A11a) is hydrogenated bisphenol A diglycidyl ether (HBADGE).

6. The curable composition according to claim 1, wherein compound (A11b) is (meth)acrylic acid.

7. The curable composition according to claim 1, wherein compound (A1) is present in at least 50 w % relative to the total amount of compounds (A1) and (A2).

8. The curable composition according to claim 1, wherein the number average molecular weight of compound (A) is at least 1500 g/mol.

9. The curable composition according to claim 1, wherein the hydroxyl value of compound (A) is comprised between 10-80 mg KOH/g of solid material.

10. The curable composition according to claim 1, wherein the curable composition is used for dual cure application, for conformal coating, for composites, for three dimensional (3D) applications, for thick pigmented systems, for thermoforming, for thermoformable inks or for molding applications.

11. A method of thermoforming or molding for producing a shaped article by molding or thermoforming a substrate, film or foil, comprising:
coating the substrate, film or foil with the curable composition according to claim 1 to obtain a coated substrate, film or foil, and
thermoforming the coated substrate, film or foil.

12. A method of thermoforming or molding for producing a shaped article by molding or thermoforming a substrate, film or foil, comprising:
coating the substrate, film or foil with the curable composition according to claim 1 to obtain a coated substrate, film or foil,
thermoforming the coated substrate, film or foil to obtain a thermoformed article, and
subsequently exposing the thermoformed article to actinic radiation.

13. Substrate, film or foil printed or coated with a curable composition according to claim 1.

14. The curable composition according to claim 1, wherein compound (A3) is selected from the group consisting of 1,6-diisocyanatohexane (HDI), 1,1'-methylene bis[4-isocyanatocyclohexane] (H12MDI), and 5-isocyanato-1-isocyanatomethyl-1,3,3 trimethyl-cyclohexane (isophorone diisocyanate, IPDI).

* * * * *